Oct. 1, 1968  W. A. RHODES, JR  3,403,436
METHOD OF PLACING A SHEATH OVER A FILAMENT-LIKE MEMBER
Filed Aug. 31, 1966
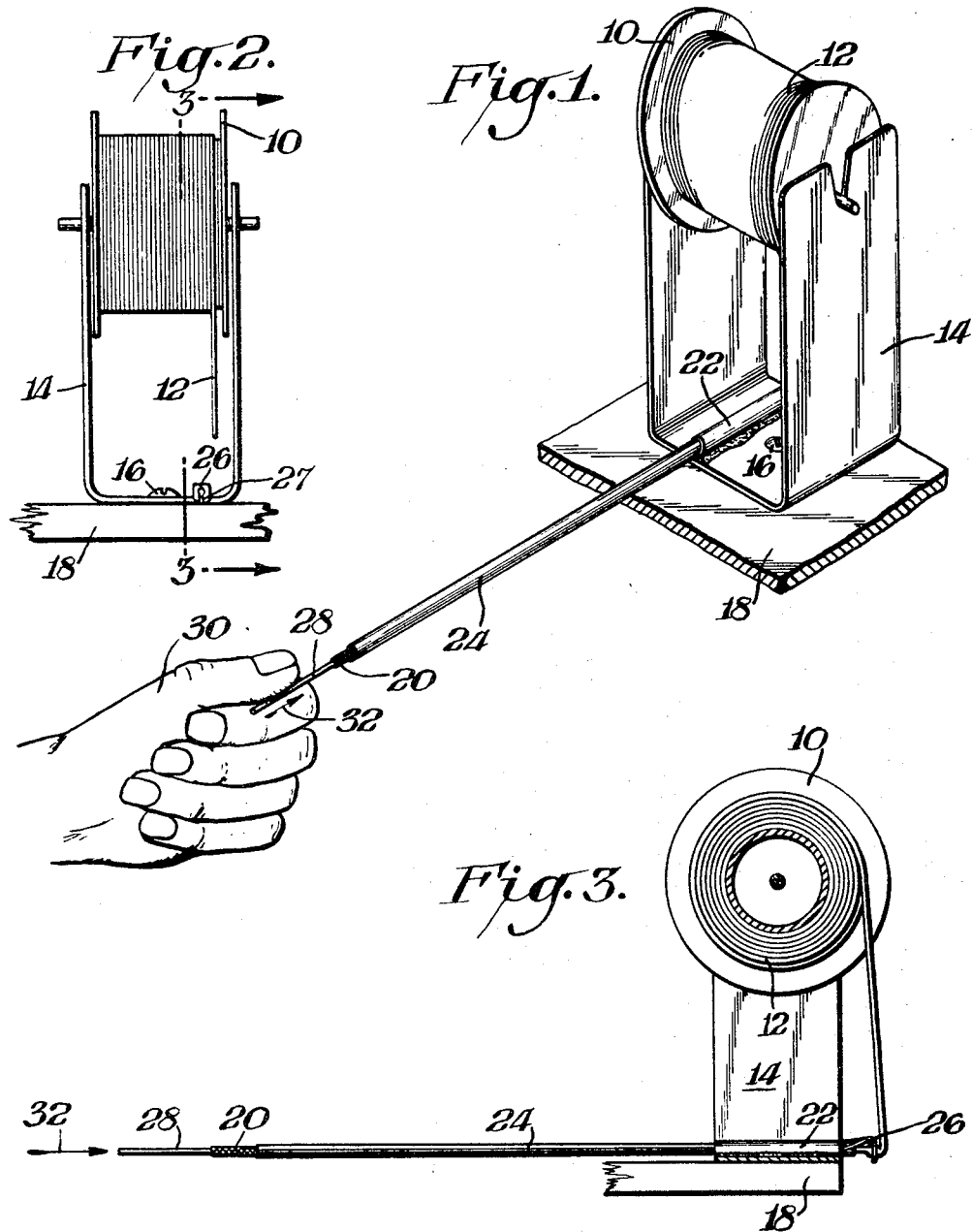
INVENTOR
William A. Rhodes, Jr.
BY Mortenson and Weigel
ATTORNEYS United States Patent Office 3,403,436
Patented Oct. 1, 1968

3,403,436
METHOD OF PLACING A SHEATH OVER A FILAMENT-LIKE MEMBER
William A. Rhodes, Jr., Avondale, Pa., assignor to Hewlett-Packard Company, Palo Alto, Calif., a corporation of California
Filed Aug. 31, 1966, Ser. No. 576,284
6 Claims. (Cl. 29—450)

This invention relates to a method of placing a woven sheath over a filament-like member wherein the sheath is woven of spirally disposed threads.

When manufacturing electrical components, it often becomes necessary to place a protective or insulative sheath over a wire or other filament-like member. In one particular application, a thermocouple wire must be placed within a woven, fiber glass, insulating sheath. The fiber glass insulating sheath is woven by interlacing fiber glass yarn spirally so as to form the tubular sheath. With such a sheath the spirally woven threads have certain properties which render it extremely difficult to place the sheath over the wire. When the spirally extending threads or yarns comprising the sheath are subjected to a longitudinal tension, they tend to decrease the diameter of the sheath. Hence if one attempts to pull the sheath over the wire, the sheath contracts and grips the wire. The harder the sheath is pulled, the tighter the wire is gripped.

Although the fiber glass sheath can be placed over the thermocouple wire by hand, for example, it is a time-consuming, tedious job which often results in the formation of blisters on the fingers of the operator.

It is therefore an object of this invention to obviate many of the disadvantages inherent in prior methods of placing a spirally woven sheath over a filament-like member.

Another object of this invention is to provide an improved method for easily and quickly inserting a filament-like member into a woven sheath.

In accordance with the method of this invention, a wire is inserted into a tubular sheath, woven with spirally extending threads, by first feeding the sheath through a relatively rigid guide tube, restricting the longitudinal movement of the sheath through the guide tube at one end thereof, introducing one end of the wire into the sheath in the other or front end of the guide tube, moving the wire axially into the guide tube which movement shortens the sheath that is within the guide tube, thereby increasing its diameter and permitting the wire to telescope into the thus enlarged portion of the sheath, and finally withdrawing the wire from the guide tube and sheath.

The spirally woven threads in the sheath are subjected to longitudinal tension and tend to tighten about and grip the wire such that, as the wire is withdrawn, additional sheathing material is drawn into the guide tube. When the wire is again inserted into the guide tube, it penetrates more deeply along the axis of the sheath. By successively introducing and withdrawing the length of wire into and out of the guide tube, the entire length of the wire may be gradually introduced into the sheath until it is entirely covered.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

FIGURE 1 is a pictorial view illustrating several of the steps of the method of this invention;

FIGURE 2 is an end view of the device illustrated in FIGURE 1, that may be used in connection with the method of this invention;

FIGURE 3 is a side view of the device illustrated in FIGURE 2;

FIGURE 4 is an enlarged, partial-sectional view showing the interaction between the sheath and wire while performing one step of the method of this invention;

FIGURE 5 is an enlarged view of a wire sheathed using the method of this invention.

In the drawing there is shown an apparatus which may be used in connection with the method of this invention. As may be seen therein, particularly in FIGURES 1, 2, and 3, a supply spool 10 of flexible, braided sleeving or sheathing 12 is rotatably mounted on a U-shaped frame member 14 which may be suitably formed out of sheet stock and mounted as by a screw 16 to a table, bench or other base member 18. The sheathing 12 may be any suitable braided or woven, tubular sheathing such as that available, for example, from Bentley-Harris Manufacturing Co., Conshohocken, Pa., or Electra Insulation Corp. of Woodside, N.Y., sold under the trade name "Silver-Flex." A particular type of sheathing which has been used with the method of this invention is a fiber glass insulating sheathing. Sheathing of this type is formed with spirally disposed, woven threads 20 (FIG. 5). A property of this sheathing 12 is that when subjected to longitudinal tension, it contracts such that the sheathing is of a reduced diameter and conversely when subjected to longitudinal compression it tends to expand thereby producing a sheathing of greater diameter.

The method of this invention makes use of this property of the sheathing by forming a tube holder 22 from suitable substantially rigid tubing. The tube holder 22 is attached, as by brazing or clamping, to the bottom portion of the U-shaped frame member 14. Next a relatively rigid piece of guide tubing 24, which may be formed from any suitable plastic, fiber, or stainless steel tubing and whose length varies with the length of the wire or other elongated filament-like member 28 that is to be sheathed or sleeved, is introduced or inserted into the tube holder 22. Prior to introducing the guide tube 24 into the tube holder 22, the sheathing 12 is threaded from the spool 10 through the slotted end of the tube holder 22 and through the guide tube 24. The end of the tube holder 22 (as seen in FIG. 3) may be partially sawed, crushed, bent over in an L-shape, and drilled so as to form a restricting orifice 26 of slightly reduced diameter. The function of this orifice is to restrict but not to prevent the axial movement of the sheathing 12 therethrough. The orifice 26 is slotted at 27 to facilitate placing the sheathing therethrough. In the alternative, this orifice 26 may comprise a rubber cap placed over the end of the tube holder 22 and having a small central axial hole formed therein to accommodate the sheathing 12. The guide tube 24 should be fitted fairly snugly against the orifice 26 to provide radial support for the sheathing during operation.

To perform the method, one end of the wire (insulated or otherwise) or other filament-like member 28 is introduced into the free end of the sheathing which protrudes from the free end of the guide tube 24. It is assumed that the sheathing 12 was previously introduced through the guide tube 24 and orifice 26 from the supply spool 10. The wire 28 is now axially moved, as by an operator's hand 30, or other suitable prime mover, axially into the guide tube 24, in the direction of the arrow 32. This movement shortens, bit by bit, segment by segment, in a wormlike fashion, that portion of the sheathing 12 that is within the guide tube 24, thereby increasing its diameter (as seen in FIG. 4). This increase in diameter results from the spiral structure of the threads forming the braided or woven sheath 12. The increased diameter of the sheathing 12 permits the wire to telescope into the sheathing 24.

Next the wire 28 is partially withdrawn from the guide member 24. This operation elongates the sheathing 12 thereby reducing its diameter (due to the spiral weave of the threads) causing the sheathing to grip the wire 28 and thereby draw additional sheathing from the spool 10 through the restricted diameter, slotted-orifice 26. The previous step is now repeated and the wire is again moved axially into the guide tube 24. This time it penetrates more deeply into the sheathing. By successively introducing and withdrawing the wire 28, the sheathing, very quickly and very easily, is caused to encase the entire length of the wire. When completely encased, the wire 28 is fully withdrawn from the guide tube 24 and the sheathing 12 trimmed at the end of the wire. Another piece of wire may now be sheathed.

The method of this invention may be used essentially with any size tubing. The only requirement on the guide tube size is that its inside diameter approximate the enlarged outside diameter of the sheath. This requirement is not critical, but if the sheath is restricted or impeded in increasing its diameter by the guide tube, or if the guide tube inside diameter is appreciably greater than the enlargd diameter of the sheath, efficient operation of the invention may be impaired. The length of the guide tube should be slightly less than the length of wire to be sheathed.

There has thus been described a relatively novel method of introducing a wire into a spirally woven sheathing which method is not only quick but may be implemented readily with relatively simple inexpensive equipment.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:
1. A method of introducing a filament-like member into a flexible sheath woven of spirally extending threads, comprising the steps of:
   feeding said sheath through a relatively rigid guide tube,
   introducing one end of said filament-like member into the end of said sheath protruding from one end of said guide tube,
   restricting the axial movement of said sheath at the other end of said guide tube, and moving said filament-like member axially into said guide tube,
   such movement shortening the portion of said sheath within said tube, increasing its diameter, and permitting the filament-like member to telescope into said sheath.

2. The method according to claim 1 which includes the additional step of next partially withdrawing said member from said guide tube, such movement elongating said sheath, reducing its diameter, and causing said sheath to grip said member and draw an additional length of said sheath through said guide tube.

3. The method according to claim 2 including the additional steps of alternately axially moving said member into and out of said guide tube until the entire length of said member is sheathed.

4. The method according to claim 3 including the additional step of completely withdrawing the sheathed member from said guide tube.

5. The method according to claim 4 including the additional step of next trimming said sheath at the end of said member.

6. The method according to claim 2 including the additional steps of completely withdrawing the sheathed member from said one end of said guide tube, and restricting the axial movement of said sheath by passing said sheath through an orifice having a cross-sectional area less than the cross-sectional area of said sheath.

References Cited
UNITED STATES PATENTS

| | | | |
|---|---|---|---|
| 710,817 | 10/1902 | Stevens | 29—234 |
| 840,799 | 1/1907 | Paar | 29—234 |
| 2,347,003 | 4/1944 | Searle | 29—234 |
| 2,366,359 | 1/1945 | Searle | 29—450 |
| 2,914,845 | 12/1959 | Crites | 29—450 |
| 3,123,906 | 3/1964 | Frink | 29—234 X |

CHARLIE T. MOON, *Primary Examiner.*